US011070489B2

(12) United States Patent
Hu et al.

(10) Patent No.: US 11,070,489 B2
(45) Date of Patent: Jul. 20, 2021

(54) RESOURCE CONSUMPTION CONTROL

(71) Applicant: INTERNATIONAL BUSINESS MACHINES CORPORATION, Armonk, NY (US)

(72) Inventors: Yong Deng Hu, Beijing (CN); Jing Li, Beijing (CN); Qiang Liu, Beijing (CN); Jing Quan, Beijing (CN); Jian Wang, Beijing (CN); Xing Xing Di, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 15/802,023

(22) Filed: Nov. 2, 2017

(65) Prior Publication Data
US 2019/0132258 A1 May 2, 2019

(51) Int. Cl.
*G06F 15/173* (2006.01)
*H04L 12/927* (2013.01)
*H04L 12/911* (2013.01)

(52) U.S. Cl.
CPC .......... *H04L 47/805* (2013.01); *H04L 47/823* (2013.01)

(58) Field of Classification Search
CPC ... H04L 47/805; H04L 47/76; H04L 43/0876; G06F 9/5011; G06F 11/006
USPC ........................................ 709/226, 224, 223
See application file for complete search history.

(56) References Cited

U.S. PATENT DOCUMENTS

| 6,810,495 | B2* | 10/2004 | Castelli | G06F 11/1438 |
| | | | | 714/47.2 |
| 8,032,409 | B1* | 10/2011 | Mikurak | G06Q 30/00 |
| | | | | 705/14.39 |
| 8,117,505 | B2* | 2/2012 | Sridharan | G06F 11/004 |
| | | | | 700/108 |
| 9,521,218 | B1 | 12/2016 | Fan et al. | |
| 2005/0086659 | A1 | 4/2005 | Huras et al. | |
| 2005/0165925 | A1* | 7/2005 | Dan | G06F 9/5083 |
| | | | | 709/224 |
| 2009/0282406 | A1 | 11/2009 | Malki et al. | |
| 2010/0153157 | A1* | 6/2010 | Wade | G06Q 10/0631 |
| | | | | 705/7.12 |
| 2012/0017114 | A1* | 1/2012 | Timashev | G06F 11/1451 |
| | | | | 714/15 |
| 2013/0204650 | A1* | 8/2013 | Sabharwal | G06Q 30/016 |
| | | | | 705/7.13 |
| 2013/0227135 | A1* | 8/2013 | Koktan | H04L 43/0876 |
| | | | | 709/224 |

(Continued)

OTHER PUBLICATIONS

Mell et al., "The NIST Definition of Cloud Computing," U.S. Department of Commerce, National Institute of Standards and Technology, Sep. 2011, p. 1-7, Special Publication 800-145.

*Primary Examiner* — Kaylee J Huang
(74) *Attorney, Agent, or Firm* — Elliot J. Shine

(57) ABSTRACT

A method, computer program product, and system are provided. A resource exhaustion is predicted based on the available resource and a consumption speed of the resource in a bare-metal server. Then it is determined whether the resource exhaustion will have an impact on the Service Level Agreement (SLA) and, responsive to the determination that the resource exhaustion will have an impact on the SLA, a control of the resource consumption speed is enacted to slow down the resource exhaustion and to maintain the SLA.

20 Claims, 5 Drawing Sheets

(56) References Cited

U.S. PATENT DOCUMENTS

| | | | |
|---|---|---|---|
| 2015/0215426 A1* | 7/2015 | Torii | H04L 67/32 709/201 |
| 2016/0092534 A1* | 3/2016 | Choudhury | G06F 16/27 707/649 |
| 2017/0214773 A1 | 7/2017 | Fan et al. | |

* cited by examiner

RESOURCE CONSUMPTION CONTROL

BACKGROUND

The present application relates to improved data processing, and more specifically, to a method and apparatus for resource consumption control in the cloud.

An emerging information technology (IT) delivery model is cloud computing, through which shared resources, software, and information are provided over the Internet to computers and other devices on-demand. Cloud computing can significantly reduce IT costs and complexities while improving workload optimization and service delivery. Most cloud computing infrastructure consists of reliable services delivered through data centers and built on servers.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in which a resource exhaustion is predicted based on an available resource and a consumption speed of the resource in a bare-metal server. Then it is determined whether the resource exhaustion will have an impact on the Service Level Agreement (SLA) and in responsive to the determination that the resource exhaustion will have an impact on the SLA, a control of the resource consumption speed is initiated to slow down the resource exhaustion to maintain the SLA.

In other illustrative embodiments, a computer program product comprising a computer useable or readable medium having a computer readable program is provided. The computer readable program, when executed on a computing device, may cause the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
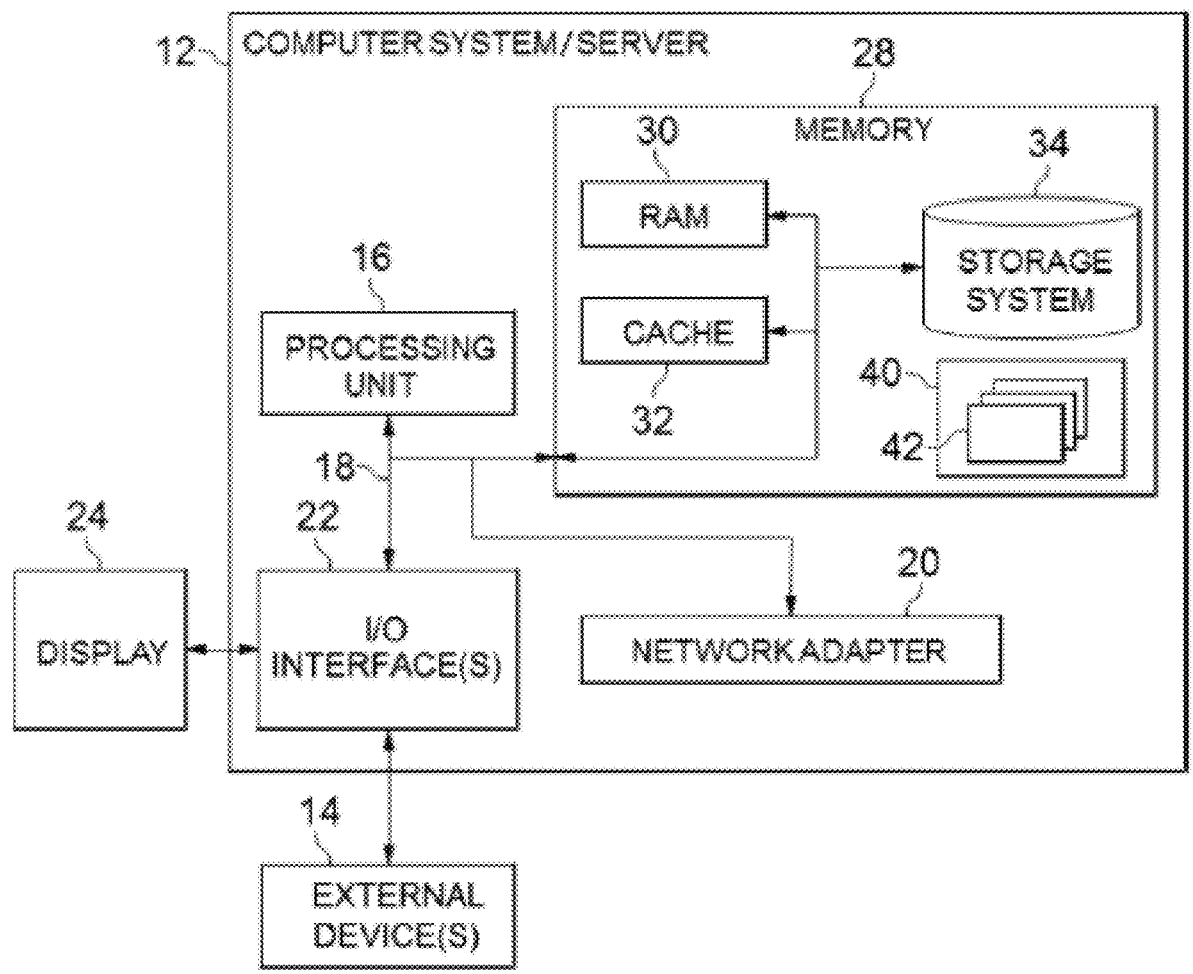
FIG. 1 depicts a cloud computing node according to an embodiment of the present invention.

Some preferable embodiments will be described in more detail with references to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
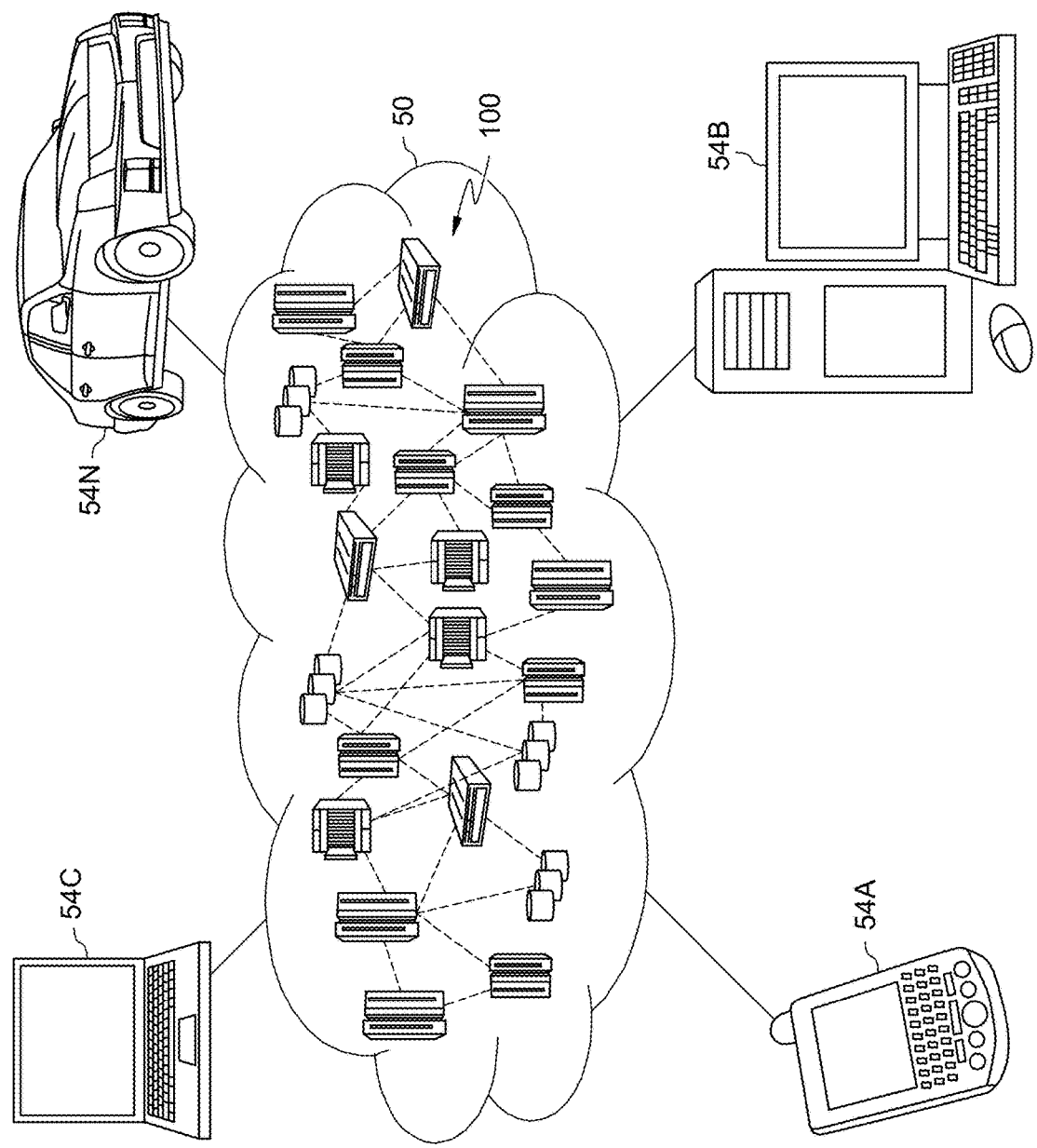
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
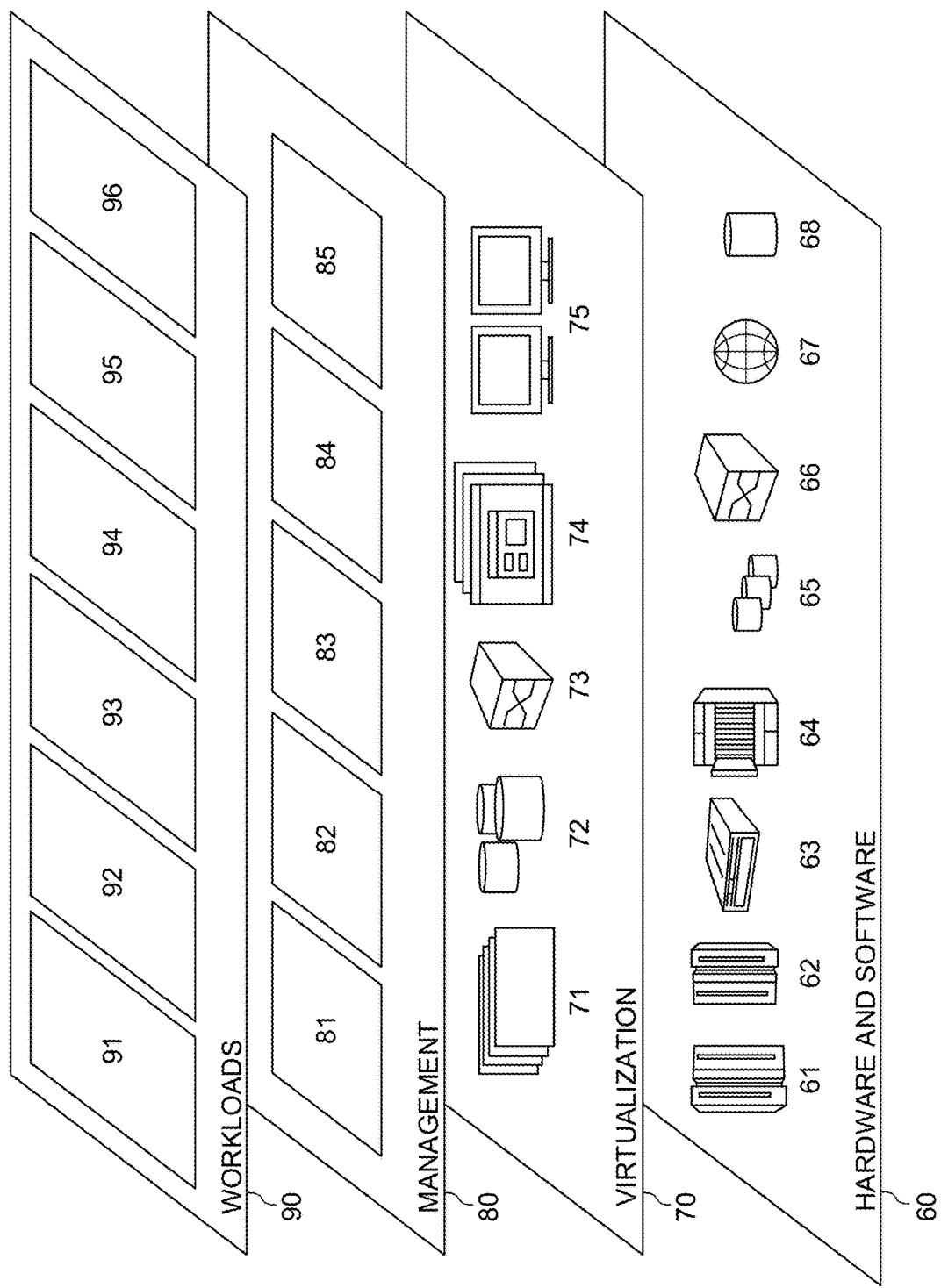
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and other functionalities 96.

Daily cloud operations may produce huge amount of data, e.g., database operation intermediate results, middleware/application logs, temporary files, which might lead to unexpected resource exhaustion, especially in mass data processing system, or system dealing with great scale compute-intense tasks. Resource exhaustion in bare-metal servers will lead to deterioration of Service Level Agreement (SLA), or in some worse cases, malfunction of services running on the bare-metal servers if it cannot be handled timely by an operation team. Bare-metal servers have a single 'tenant'. They are not shared between customers. Traditional auto-scaling approaches adopted in virtualization environment fail to solve the problem as a response time is typically needed by the operation team to deal with the resource exhaustion. The resource exhaustion may happen long before it is handled properly by the operation team which result in impacts on business, therefore it is important to provide a solution to solve the resource exhaustion problem in bare-metal servers.

Figure 4:
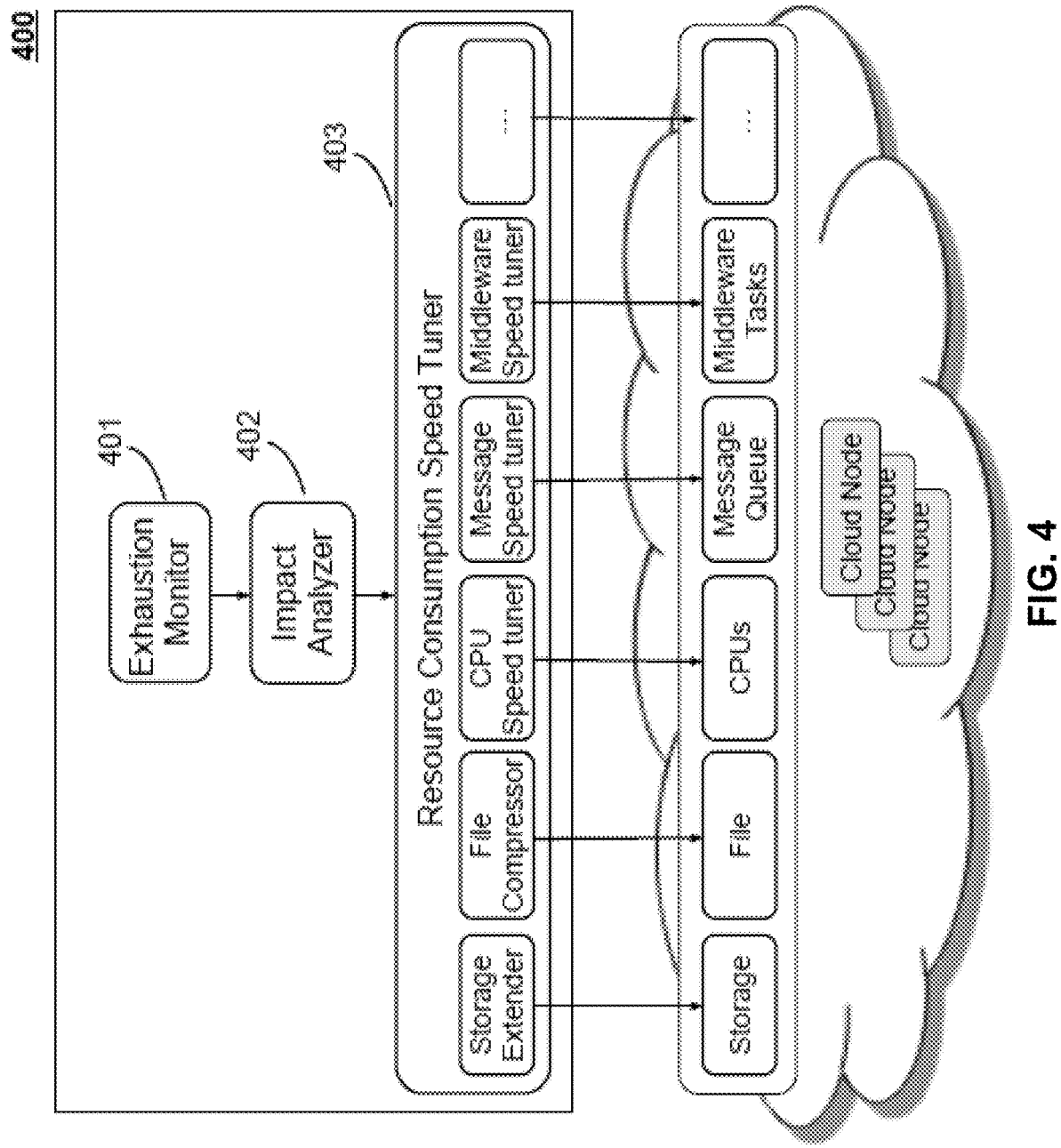
FIG. 4 illustrates an exemplary diagram of a system 400 according to an embodiment of the present invention.

Referring now to FIG. 4, which illustrates an exemplary diagram of a system 400 according to an embodiment of the present invention. The system 400 according to an embodiment of the present invention comprises an exhaustion monitor 401, an impact analyzer 402, and a resource consumption speed tuner 403. According to an embodiment of the present invention, the exhaustion monitor 401 receives a resource exhaustion predicted based on an available resource and a consumption speed of the resource in a bare-metal server. The resource exhaustion $T_{Ex}$ may be predicted using the following function:

$$T_{Ex} = \text{Forecast}(S, V)$$

In this function, $T_{Ex}$ represents the predicted resource exhaustion, which is a time duration that represents the duration before resource in question is consumed totally, S represents current available resource, and V represents the consumption speed of the resource. Both the available resource and the consumption speed could be obtained from a resource management application (not illustrated in FIG. 4) running on the bare-metal server. Alternatively, the consumption speed could also be obtained from a knowledge base which stores corresponding historical consumption speed data. The function Forecast( ) is a function learnt from historical data saved in the same or another knowledge base, or a simplified linear/nonlinear function. The learning process of the function Forecast( ) may be implemented using various existing technologies, and hence will not be discussed here for the purpose of simplification. Using the learnt/obtained function and obtained available resource and consumption speed, the resource management application may calculate the predicted resource exhaustion and send it to the exhaustion monitor 401. According to various embodiments of the present invention, the exhaustion monitor 401 could either be a standalone module that receives the predicted resource exhaustion, or be integrated into the functionalities of the resource management application running on the bare-metal server.

For the purpose of illustration, the present invention will be discussed in the following with storage as the resource, however it should be appreciated to those with ordinary skills in the art that the invention could also be applied to other types of resources without departing from the underlying principles and scope of the invention will be understood and readily occur to those skilled in the art.

Upon receiving the predicted resource exhaustion, the exhaustion monitor 401 passes on the predicted resource exhaustion to the impact analyzer 402 where whether the predicted resource exhaustion will have an impact on the Service Level Agreement (SLA) is determined. As mentioned above, the predicted resource exhaustion may be a time duration that represents the duration before the resource in question is consumed totally. According to an embodiment of the present invention, by simply comparing the predicted resource exhaustion $T_{Ex}$ with a response time $T_r$ of the operation team, it could be easily determined whether the resource exhaustion will have an impact on the SLA. If the predicted resource exhaustion is shorter than the response time ($T_{Ex} < T_r$), the resource exhaustion will have an impact on the SLA. In some cases, the impact on the SLA might be catastrophic if the predicted resource exhaustion is much shorter than the response time ($T_{Ex} << T_r$), as it might lead to a complete system failure. Therefore, according to an embodiment of the invention, the predicted resource exhaustion is compared with the sum of the response time $T_r$ and a buffer duration $\Delta t$. If the predicted resource exhaustion is shorter than the sum ($T_{Ex} < T_r + \Delta t$), it will be determined that the resource exhaustion will have an impact on the SLA. Both the response time and the buffer duration could be obtained from a knowledge base or as inputs of the system 400 from an administrator. According to another embodiment of the present invention, the predicted resource exhaustion is compared with a preset threshold value. If the predicted resource exhaustion is shorter than then value, it will be determined that the resource exhaustion will have an impact on the SLA.

If it is determined that the predicted resource exhaustion will have an impact on the SLA, the resource consumption speed tuner 403 may be controlled to initialize a series of controls of the consumption speed of the resource to slow down the resource exhaustion to maintain the SLA. As shown in FIG. 4, the resource consumption speed tuner 403 comprises several components which control the consumption speed of the resource which including storage extender, file compressor, CPU speed tuner, message speed tuner, middleware speed tuner etc. In response to the determination that the resource exhaustion will have an impact on the SLA, the resource consumption speed tuner 403 could take at least one action mentioned below:

extending the storage;
compressing data files;
tuning CPU speed;
tuning message processing speed;
tuning middleware processing speed, etc.

Controlling the resource consumption speed is mentioned above as the purpose of several actions; however, it should be noted that the actions mentioned above are only for the purpose of illustrating and will not limit the scope of the invention adversely. Other actions not mentioned could also be taken as long as they can control the resource consumption speed, it would be apparent to those skilled in the art without departing from the underlying principles and scope of the invention will be understood and readily occur to those skilled in the art.

As listed above, there are several different kinds of actions that could be taken to slow down the resource exhaustion. To reach a better control of the resource consumption speed, according to an embodiment of the present invention, a control optimizer (not illustrated in FIG. 4) may be deployed. The control optimizer may first obtain all available actions and further evaluate whether an action will result in a slowdown of the resource consumption. The evaluation could be further based on several other factors including readiness of the action, space earned by taking the action, financial loss of the action etc. acquired from a knowledge base learnt from historical data. And, based on the evaluation, a prioritized list of actions that could be taken may be determined and then executed by the resource consumption speed tuner 403. In the following table are shown some of the factors which may be considered in evaluating what actions to be taken, that are stored in a knowledge base for easy retrieval. As shown below, storage extension will bring constant costs as it will need constant time (readiness), earn constant space (space earned as the added space), constant financial loss, while compressing file will bring predictable costs as it is determined by the file size. It should be understood to those skilled in the art, the illustrated following table is only for the purpose of explaining the invention and will not limit the scope of the invention adversely.

TABLE 1

Several Factors in Evaluating What Actions to Be Taken

| Actions | Readiness | Space Earned | Financial Loss | ... |
|---|---|---|---|---|
| Storage Ext. | constant | Constant | constant | |
| Compression | T = f (file_size) | S = g (file_size) | 0 | |
| Speed Tuning | 0 | 0 | 0 to constant | |
| Message Speed Tuning | 0 | 0 | 0 | |
| Middleware Speed Tuning | 0 | 0 | 0 | |
| ... | ... | ... | ... | |

In the above table, T = f(file_size) is the time needed by file compression and S = g(file_size) is the storage earned by file compression.

The prioritized list of actions could be in the form of the following: actions {(message speed tuning, middleware speed tuning), CPU speed tuning, file compression, storage extension} considering the financial loss as a key factor, or actions {storage extension, (message speed tuning, middleware speed tuning), file compression, CPU speed tuning} considering the comprehensive factors, or in any other order that is proper in prioritizing the actions.

After actions to be taken has been determined, the resource consumption speed tuner 403 may take corresponding actions based on the determination to control the speed of resource consumption to slow down the resource exhaustion.

According to an embodiment of the present invention, upon the determination that the resource exhaustion will have an impact on the SLA or after actions have been taken, an alert module (not illustrated in FIG. 4) issues an alert to the administrator of the bare-metal server.

According to another embodiment of the present invention, the impact analyzer 402 further evaluates whether the control of the consumption speed is effective and adjusts the control of the consumption speed to further slow down the resource consumption in responsive to the determination that the consumption speed is ineffective. The adjustment of further slowing down the resource consumption speed could, for example, i) take actions in the prioritized list other than those actions have been taken, ii) further take the same action in the prioritized list (e.g. further compress files, or further tuning CPU speed), or iii) any combination of the above two different approaches.

According to another embodiment of the present invention, the exhaustion monitor 401 receives the predicted resource exhaustion periodically.

Figure 5:
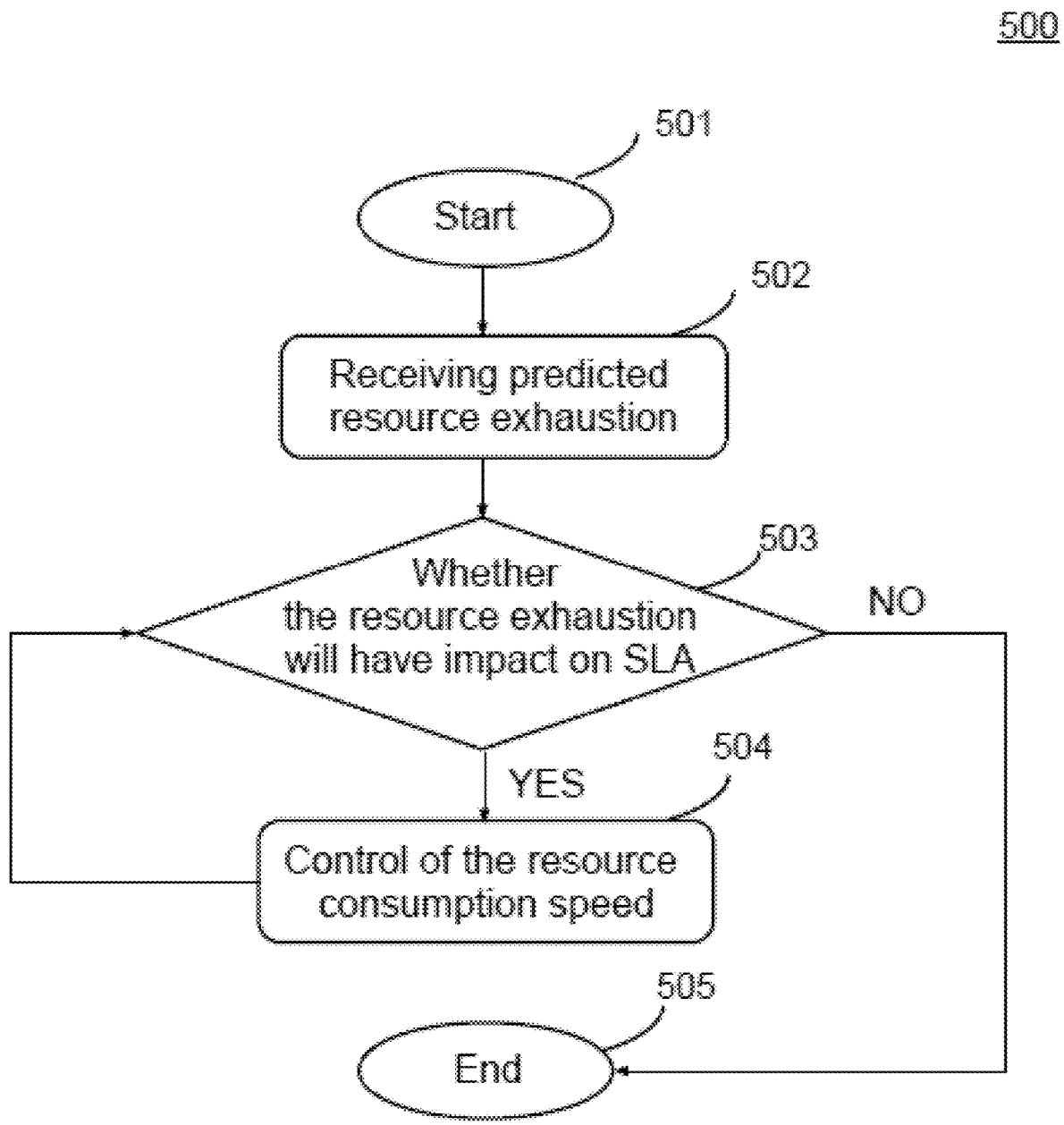
FIG. 5 illustrates a flowchart of an exemplary method 500 according to an embodiment of the present invention.

The system 400 according to an embodiment of the present invention has been discussed in the above. Now turning to FIG. 5, a method 500 according to an embodiment of the present invention is illustrated. The method 500 starts from Step 501 and proceeds to Step 502, in which a resource exhaustion predicted based on an available resource and a consumption speed of the resource in a bare-metal server is received.

Then, in Step 503, whether the resource exhaustion will have an impact on the Service Level Agreement (SLA) is determined. If it is determined that the resource exhaustion will have an impact on the SLA, a control of the resource consumption speed may be initiated to slow down the resource exhaustion to maintain the SLA, as shown in Step 504.

According to an embodiment of the present invention, in response to the determination that the resource exhaustion will have an impact on the SLA, an alert is issued to the administrator of the bare-metal server.

According to an embodiment of the present invention, whether the control of the consumption speed is effective is further evaluated and in responsive to the determination of the consumption speed being ineffective, the control of the consumption speed is adjusted to further slow down the resource consumption.

According to an embodiment of the present invention, the control of the consumption speed is accomplished by taking at least one action selected from the group consisting of extending the storage, compressing data files, tuning CPU speed, tuning message processing speed, tuning middleware processing speed, etc.

According to an embodiment of the present invention, the action(s) are prioritized considering at least one factor selected from the group consisted of: readiness of the action, space earned by taking the action, financial loss of the action, etc.

According to another embodiment of the present invention, the predicted resource exhaustion is received periodically.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    identifying, by a processor, a resource exhaustion predicted based on an available resource and a consumption speed of the available resource in a bare-metal server;
    determining, by the processor, whether the resource exhaustion will have an impact on a Service Level Agreement (SLA) based on a predicted time of the resource exhaustion being less than a response time of a human operation team to alleviate the resource exhaustion; and
    responsive to determining the resource exhaustion will have an impact on the SLA, initiating, by the processor, a control of the consumption speed to slow down the resource exhaustion to maintain the SLA.

2. The method of claim 1, further comprising:
    evaluating, by the processor, whether the control of the consumption speed is effective; and
    responsive to an evaluation the control is ineffective, adjusting, by the processor, the control of the consumption speed to further slow down the resource exhaustion to maintain the SLA.

3. The method of claim 1, wherein the control of the consumption speed is accomplished by taking at least one action selected from a group consisting of:
    extending a storage;
    compressing data files;
    tuning CPU speed;
    tuning message processing speed; and
    tuning middleware processing speed.

4. The method of claim 3, wherein the at least one action is prioritized considering at least one factor selected from a group consisting of:
    readiness of the at least one action;
    space earned by taking the at least one action; and
    financial loss of the at least one action.

5. The method of claim 1, further comprising:
responsive to determining the resource exhaustion will have an impact on the SLA, issuing, by the processor, an alert to an administrator of the bare-metal server.

6. The method of claim 1, wherein the resource includes storage.

7. The method of claim 1, wherein the resource exhaustion is identified periodically.

8. A computer program product comprising a computer readable storage medium having a computer readable program stored therein, wherein the computer readable program, when executed on a computing device, causes the computing device to:
identify a resource exhaustion predicted based on an available resource and a consumption speed of the resource in a bare-metal server;
determine whether the resource exhaustion will have an impact on the Service Level Agreement (SLA) based on a predicted time of the resource exhaustion being less than a response time of a human operation team to alleviate the resource exhaustion; and
responsive to determining the resource exhaustion will have an impact on the SLA, initiate a control of the consumption speed to slow down the resource exhaustion to maintain the SLA.

9. The computer program product of claim 8, wherein the computer readable program further causes the computing device to:
evaluate whether the control of the consumption speed is effective; and
adjust the control of the consumption speed to further slow down the resource exhaustion to maintain the SLA responsive to an evaluation that the control is ineffective.

10. The computer program product of claim 8, wherein the control of the consumption speed is accomplished by taking at least one action selected from a group consisting of:
extending a storage;
compressing data files;
tuning CPU speed;
tuning message processing speed; and
tuning middleware processing speed.

11. The computer program product of claim 10, wherein the action(s) are prioritized considering at least one factor selected from a group consisting of:
readiness of the action;
space earned by taking the action; and
financial loss of the action.

12. The computer program product of claim 8, wherein the computer readable program further causes the computing device to:
issue an alert to an administrator of the bare-metal server responsive to determining the resource exhaustion will have an impact on the SLA.

13. The computer program product of claim 8, wherein the resource includes storage.

14. A computer system, comprising:
a processor; and
a memory coupled to the processor, wherein the memory comprises instructions which, when executed by the processor, cause the processor to:
identify a resource exhaustion predicted based on an available resource and a consumption speed of the resource in a bare-metal server;
determine whether the resource exhaustion will have an impact on the Service Level Agreement (SLA) based on a predicted time of the resource exhaustion being less than a response time of a human operation team to alleviate the resource exhaustion; and
responsive to determining the resource exhaustion will have an impact on the SLA, initiate a control of the consumption speed to slow down the resource exhaustion to maintain the SLA.

15. The computer system of claim 14, wherein the instructions further cause the processor to:
evaluate whether the control of the consumption speed is effective; and
adjust the control of the consumption speed to further slow down the resource exhaustion to maintain the SLA responsive to an evaluation the control is ineffective.

16. The computer system of claim 14, wherein the control of the consumption speed is accomplished by taking at least one action selected from a group consisting of:
extending a storage;
compressing data files;
tuning CPU speed;
tuning message processing speed; and
tuning middleware processing speed.

17. The computer system of claim 16, wherein the action(s) are prioritized considering at least one factor selected from a group consisting of:
readiness of the action;
space earned by taking the action; and
financial loss of the action.

18. The computer system of claim 14, wherein the instructions further cause the processor to:
issue an alert to an administrator of the bare-metal server responsive to determining the resource exhaustion will have an impact on the SLA.

19. The computer system of claim 14, wherein the resource includes storage.

20. The computer system of claim 14, wherein the resource exhaustion is identified periodically.

* * * * *